(12) United States Patent
McMurtry

(10) Patent No.: US 6,209,411 B1
(45) Date of Patent: Apr. 3, 2001

(54) ROTARY BEARING AND DRIVE MECHANISMS

(75) Inventor: David R. McMurtry, Wotton-under-Edge (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 09/527,454

(22) Filed: Mar. 17, 2000

Related U.S. Application Data

(63) Continuation of application No. 08/910,009, filed on Aug. 12, 1997, now Pat. No. 6,047,612, which is a continuation of application No. 08/874,472, filed on Jun. 16, 1997, now abandoned.

(30) Foreign Application Priority Data

Jun. 15, 1996 (GB) .................................................. 9612587

(51) Int. Cl.[7] .................................................. G05G 11/00
(52) U.S. Cl. .................................. 74/490.06; 74/490.05; 901/29; 310/67 R; 310/89; 310/91
(58) Field of Search .......................... 74/490.06, 490.05, 74/490.03, 490.02, 490.01; 901/28, 29, 50; 464/51, 98; 384/109; 310/91, 67 R, 89

(56) References Cited

U.S. PATENT DOCUMENTS

| | | |
|---|---|---|
| 3,356,425 | 12/1967 | Carriere et al. . |
| 3,537,763 | 11/1970 | Unterberger . |
| 3,978,357 | 8/1976 | Voelbel et al. . |
| 4,690,012 | 9/1987 | Dahlquist et al. . |
| 4,737,136 | 4/1988 | Federn . |
| 4,969,795 | 11/1990 | Toyoda et al. . |
| 5,115,690 | 5/1992 | Tocii et al. . |
| 5,212,873 | 5/1993 | McMurtry . |
| 5,279,177 | 1/1994 | Inada . |

FOREIGN PATENT DOCUMENTS

| | | |
|---|---|---|
| 21 14 703 | 10/1972 | (DE) . |
| 2114703 | 10/1972 | (DE) . |
| 39 04 141 | 3/1990 | (DE) . |
| 288 999 | 11/1988 | (EP) . |
| 392 699 | 10/1990 | (EP) . |
| WO 90/07097 | 6/1990 | (GB) . |

Primary Examiner—David Fenstermacher
(74) Attorney, Agent, or Firm—Oliff & Berridge, PLC

(57) ABSTRACT

A rotary bearing has a pair (32,40) of bearing members, one of which has convex (34) and planar (36) surface portions, and the other of which has concave (42) and planar (44) surface portions. The convex and concave surface portions and the planar surface portions of the two bearing members bear against each other via an interstitial bearing medium of air, with the axial forces between the convex and concave surfaces counteracting the axial forces between the planar surface portions. When incorporated into a drive mechanism, one of the bearing members is connected to a drive shaft via a first torsionally stiff flexible diaphragm (130), and the other bearing member is mounted to a motor (50) (which rotates the drive shaft) via a second torsionally stiff flexible diaphragm. During operation, flexing of the diaphragms (110,130) accommodates eccentricity in the mounting of the motor (50) without transmitting unwanted loads to the bearing.

24 Claims, 5 Drawing Sheets

ROTARY BEARING AND DRIVE MECHANISMS

This application is a continuation Ser. No. 08/910,009 filed Aug. 12, 1997 now U.S. Pat. No. 6,047,612, which is a continuation Ser. No. 08/874,412 filed Jun. 16, 1997 now abandoned.

BACKGROUND OF THE INVENTION

1. Field of the Invention

The present invention relates to a rotary bearing, and to a mechanism which may be used to provide drive for a rotary bearing.

A rotary bearing and/or a drive mechanism may be used in an articulating probe head for a coordinate positioning machine, such as a coordinate measuring machine. Such a probe head may be mounted to the movable arm of e.g. a Cartesian coordinate measuring machine to enable orientation of an inspection probe relative to a part under inspection with two rotational degrees of freedom.

2. Description of Related Art

An articulating probe head employing a rotary bearing and drive mechanism is known from, for example, EP 317397, EP 317397 or counterpart U.S. Pat. No. 4,888,877.

SUMMARY OF THE INVENTION

A first aspect of the present invention provides a drive mechanism for rotating first and second relatively rotatable bearing members about an axis, the drive mechanism including an elongate drive shaft connected to the first bearing member, and a motor connected to the second bearing member which rotates the shaft and first member, characterised by at least one torsionally stiff flexible diaphragm which connects either the drive shaft to the first bearing member, or the motor to the second bearing member.

A second and independent aspect of the present invention provides a rotary bearing which provides relative rotation of first and second bearing members about an axis, the first and second members respectively having concave and convex spherical surface portions which circumscribe the axis and bear against each other via an interstitial bearing medium, the first and second members further being provided with planar surface portions which circumscribe the axis and bear against each other via an interstitial bearing medium, wherein axial bearing forces on the members at the spherical surface portions are counteracted by axial bearing forces on the members at the planar surface portions.

Preferably, the interstitial bearing medium will be provided by fluid, and more preferably air.

BRIEF DESCRIPTION OF THE DRAWINGS

Embodiments of the invention will now be described, by way of example, and with reference to the accompanying drawings, in which.

DESCRIPTION OF PREFERRED EMBODIMENTS

Various aspects of the present invention will be illustrated and described within the context of their use in an articulating probe head for a coordinate measuring machine, although they have more general applicability, and may be applied independently of each other.

Figure 1:
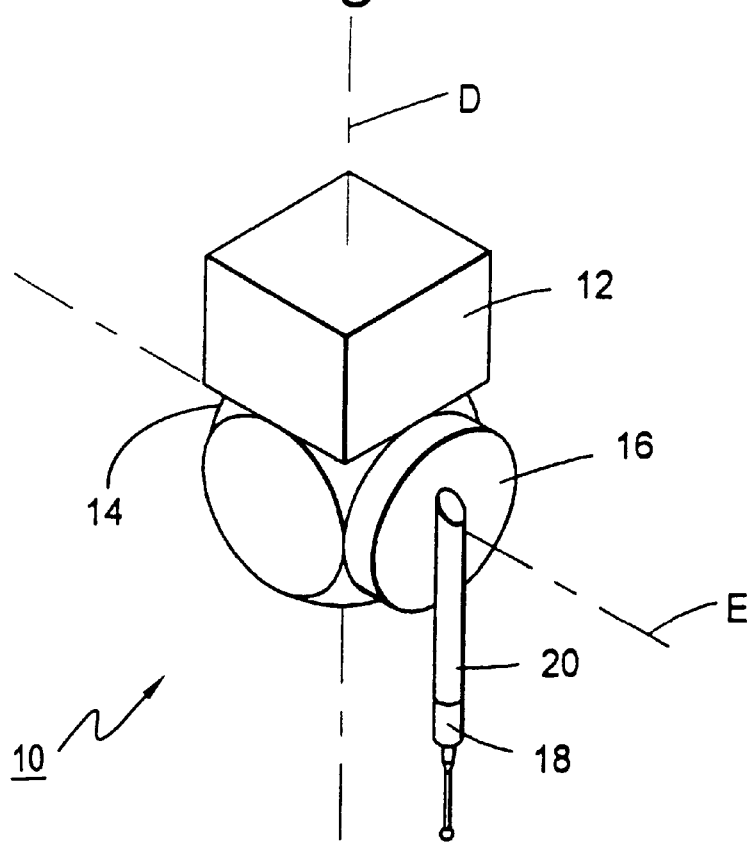
FIG. 1 is a perspective view of an articulating probe head in which bearings and drive mechanisms according to the present invention may be employed.

Referring to FIG. 1 an articulating probe head 10 includes a support or fixed structure provided by a housing 12, by means of which the probe head 10 may be mounted to the movable arm of a coordinate measuring machine (not shown). First and second rotary axis members 14,16 are serially mounted to the housing 12 in a manner enabling their rotation about first and second rotary axes D,E respectively. A touch probe 18 is connected to the second rotary axis member 16 via an extension bar 20, and is therefore rotatable relative to the movable arm of the machine with two degrees of freedom; the probe 18 may thus be used to measure the position of variously oriented surfaces of a component under inspection.

Figure 3:
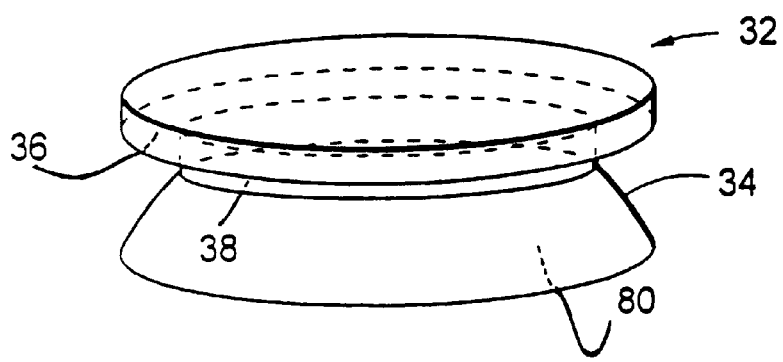
FIG. 3 is a perspective of a detail of FIG. 2.
Figure 2:
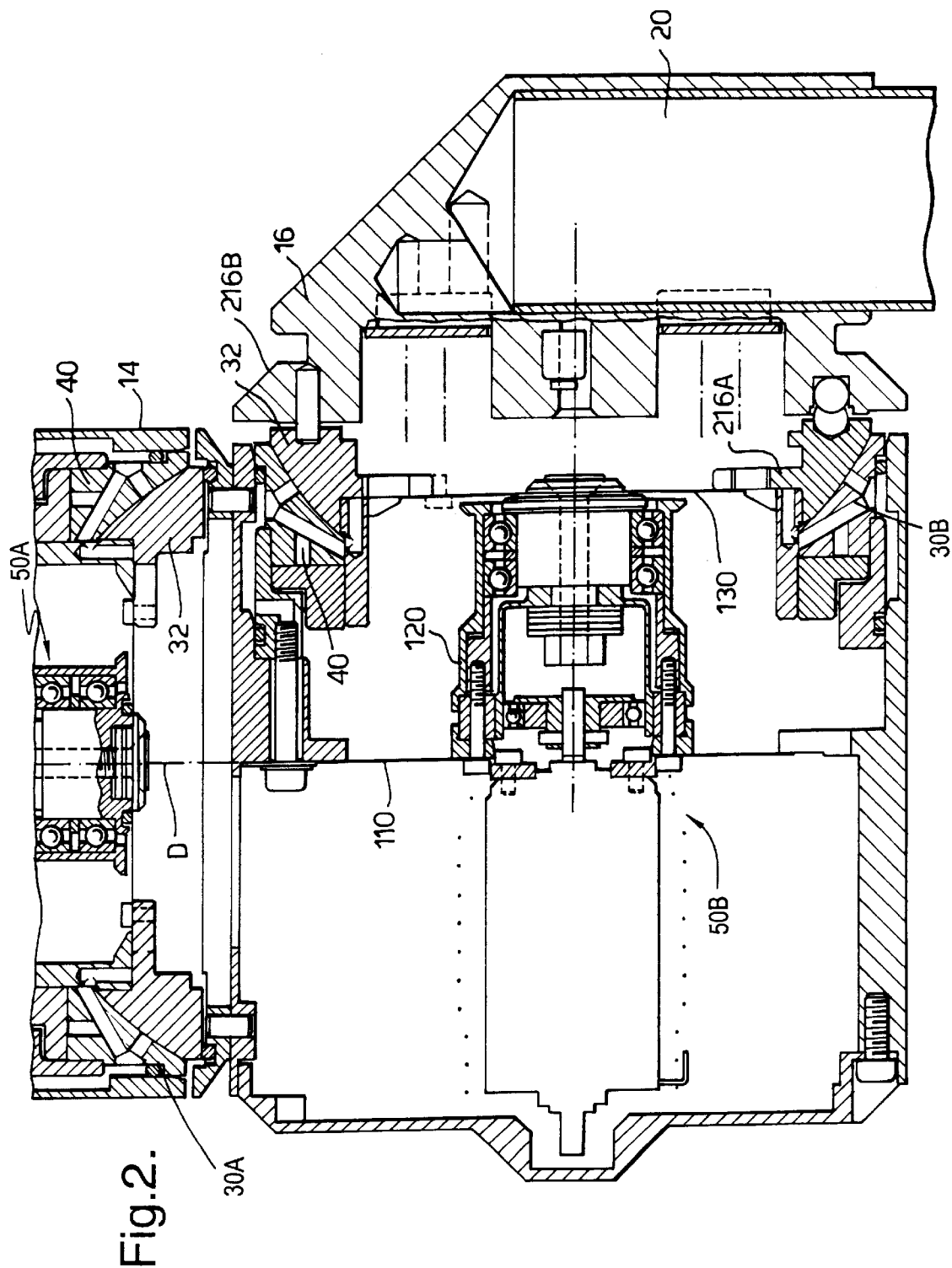
FIG. 2 is a section through part of the probe head of FIG. 1.
Figure 4:
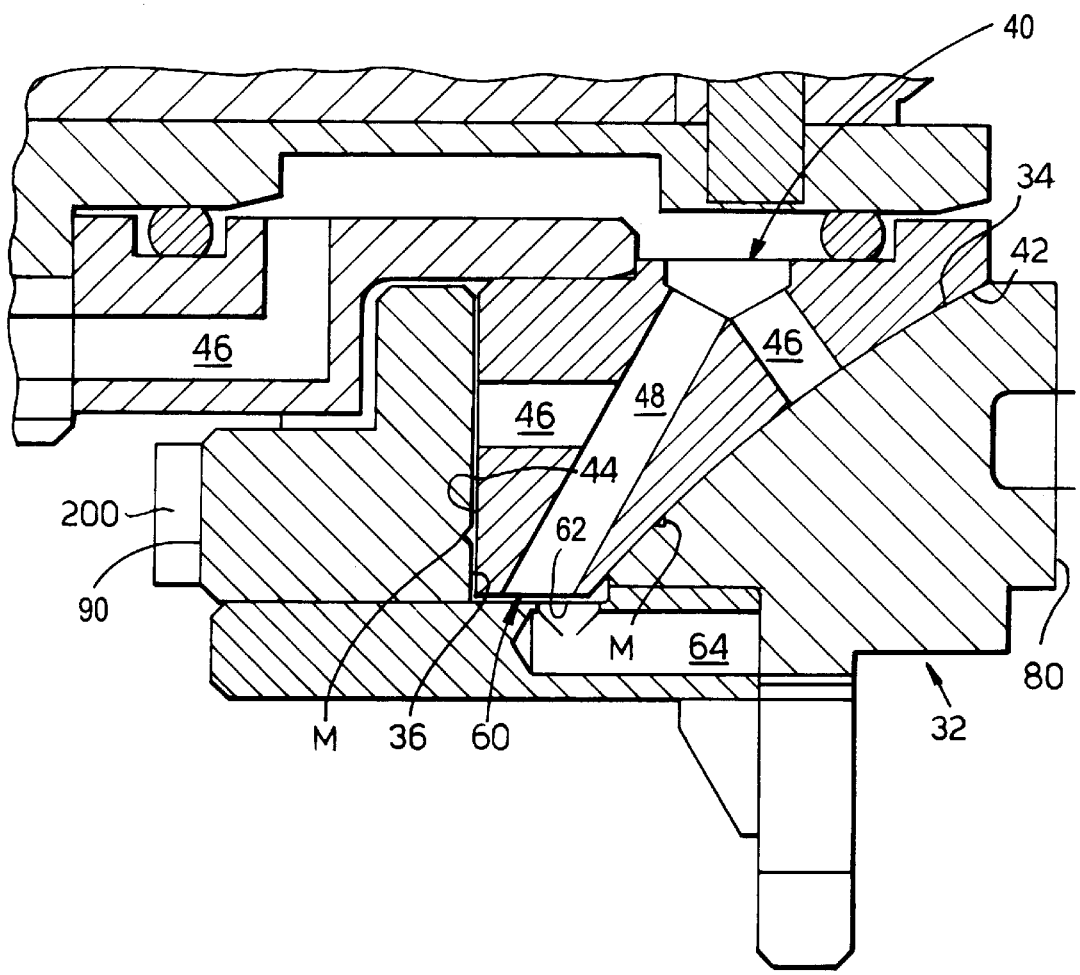
FIG. 4 is a section through a detail of FIG. 2.

Referring now to FIGS. 2 to 4, rotation of the first and second rotary axis members 14,16 relative to the housing 12 and first rotary axis member 14 respectively is provided by means of rotary air bearings 30A, 30B and motors 50A, 50B. Each air bearing 30A,B includes a first bearing member 32 having a substantially spherical convex surface 34 and a planar annular surface 36, extending around the axis of rotation and interconnected via an intermediate member 38. Convex spherical surface 34 and planar annular surface 36 bear, via an interstitial bearing medium which in this example is air, against concave spherical surface 42 and planar annular surface 44 respectively, provided on second bearing member 40.

The air is supplied to the bearing faces via conduits 46, that extends into the body of second bearing member 40. A further conduit 48 conducts air at supply pressure to an annular plenum chamber 60 defined by the surface of intermediate member 38 and adjacent surface 62 of second bearing member 40. Air bleeding from conduits 46 to supply the interstitial bearing medium exits the bearing at manifolds M, which provide the requisite pressure drop, given that air in plenum chamber 60 is at supply pressure. Air from plenum chamber 60 may be taken via a further conduit 64, provided in the body of first bearing member 32, to supply a further second bearing member of a further rotary axis. In this way, air at supply pressure may be transferred between relatively rotatable parts without the need for trailing leads, which would otherwise restrict the relatively free rotation provided by the air bearing.

The spherical surfaces 34 and 42, in conjunction with a force urging the said surfaces into engagement, define the location of the first bearing member 32 relative to the second bearing member 40 in a direction radial and parallel to the axis of relative rotation; alternatively, it may be said that the surfaces 34 and 42, together with the engaging force, co-operate to eliminate (within the stiffness limits of the bearing) relative translation of the first and second bearings members 32,40. The annular surfaces 36,44 co-operate to provide the force urging spherical surfaces 34,42 into engagement, so that, in effect, the forces on the first and second bearing members 32,40 at the spherical surfaces 34,42 and planar surfaces 36,44 counteract each other. Planar surfaces 36,44 also eliminate, to within the stiffness limits of the bearing, all relative rotation of the first and second bearing members 32,40, other than relative rotation about a single axis; this being the axis of relative rotation D,E.

Figure 5A:
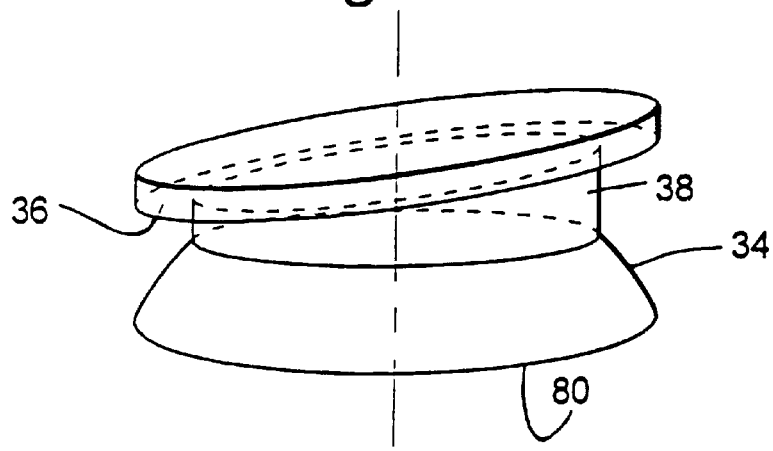
FIGS. 5a and b are perspective view of possible defects in the bearing of FIGS. 2 and 3.
Figure 5B:
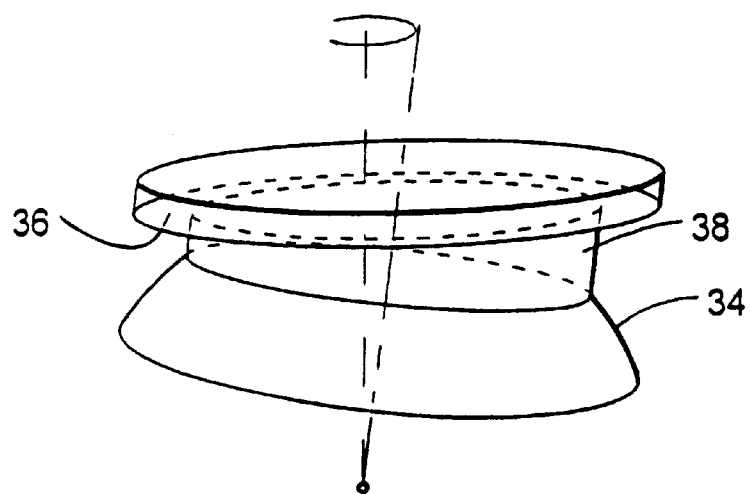

Because surfaces 34,42 are spherical, rotation of first bearing member 32 relative to second bearing member 40 will always occur about a point passing through the centre of a notional sphere defined by spherical surfaces 34,42. As a result, imperfections in the manufacture of, e.g. first bearing member 32, do not hinder satisfactory operation of the bearing. Referring now to FIGS. 5a and 5b, it can be seen from FIG. 5a that, as a result of the manufacture of intermediate member 38, annular surface 36 of first bearing member 32 does not lie parallel to the rear face 80.

However, since the axis of relative rotation will always pass through the centre of the notional sphere, the surfaces 34,42 and 36,44 will co-operate to provide swash-free rotation of the first bearing member 32 relative to the second bearing member 40. As can be seen from FIG. 5, annular surface 36 will rotate eccentrically with respect to the axis D,E of relative rotation, but this will not be a hindrance to the operation of the bearing provided that first bearing member 32 does not foul on second bearing member 40 during the course of rotation.

In practice, it is desirable that the first bearing member 32 is constructed such that planar annular surface 36 and rear surface 80 are machined parallel to each other, so that an axis member mounted to first bearing member 32 will rotate in a plane orthogonal to the rotary axis of the first bearing member 32. Additionally, it is preferable that upper surface 90 of first bearing member 32 is machined parallel to annular surface 36, in order that a code wheel 200 for a rotary encoder (not shown) may be mounted thereon, to provide an accurate measure of the magnitude of relative rotation between first and second bearing members 32,40.

Figure 6:
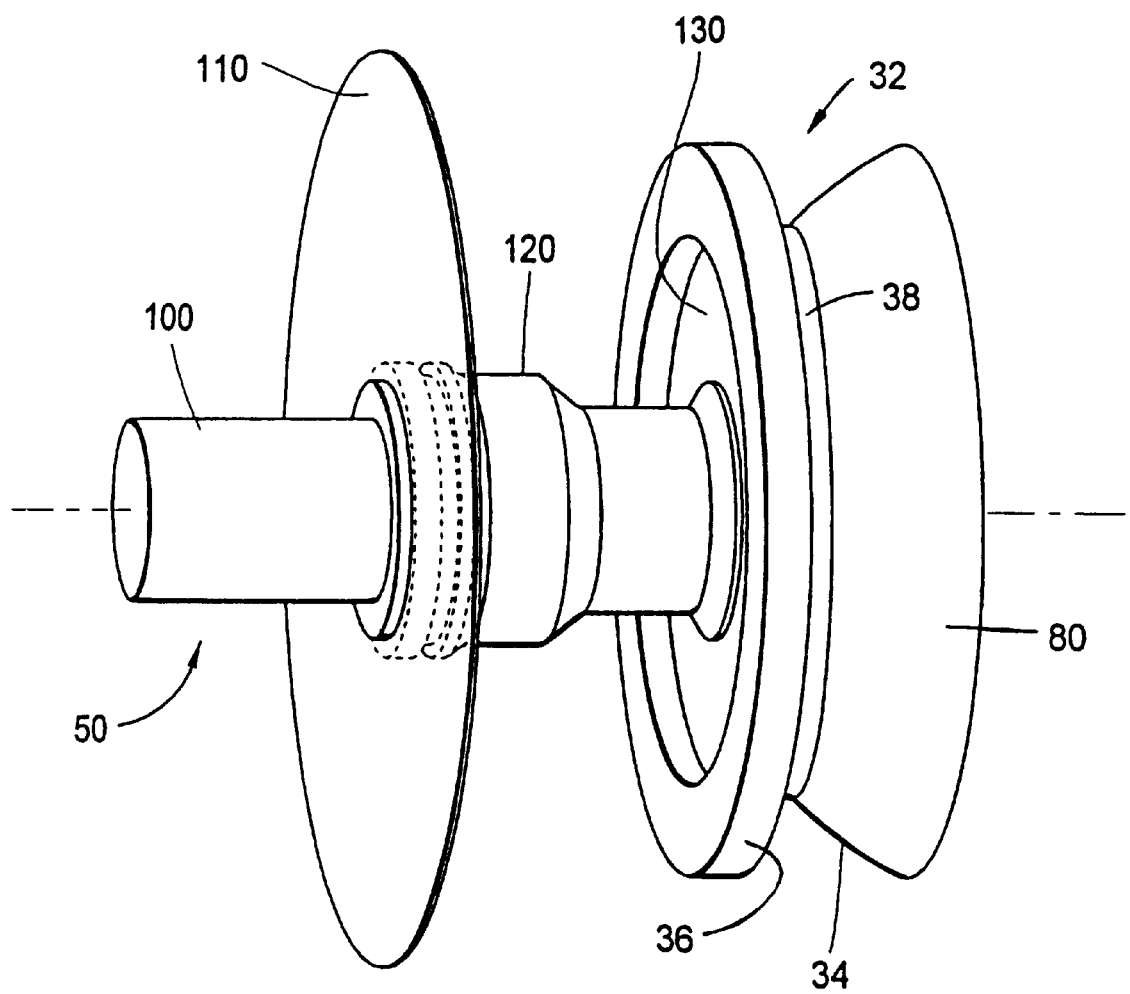
FIG. 6 is a perspective view of the bearing and motor mounting in FIGS. 1 and 2.

Referring additionally to FIG. 6 rotation between two rotary axis members, e.g. 14 and 16, is achieved by means of a motor 50. Motor 50 has a casing 100 or stator, mounted via a flexible diaphragm 110 to the first rotary axis member 14, on which second bearing member 40 is provided. The output shaft or rotor of the motor is connected via a gearbox 120 to a flexible diaphragm 130, which is in turn connected to the first bearing member 32, provided on second rotary axis member 16. This mounting of the motor ensures that, in the event of eccentric rotation of annular surface 36, as illustrated for example in FIG. 5b, deformation of diaphragms 110 and 130 will accommodate the resultant unwanted movement of the motor 50 and gearbox, preventing the transmission of forces to the bearing. The relative torsional stiffness of diaphragms 110,130 enable the control of motor 50 to provide accurate rotational positioning of the first and second rotary axis members, on the basis of outputs from the rotary encoders. Flexible diaphragms 110,130 thus allow the rotary bearings to define the axis and manner of rotation without interference due to transmission links with the motors performing the said rotations. This mounting for the drive mechanism has general applicability, and does not require the bearing configuration shown in FIGS. 2 to 5 but may instead be beneficially exploited with a standard bearing configuration.

To enable automatic exchange of one-touch probe 18 for another, typically for the purpose of performing a variety of measuring operations without the need for recalibrating the machine after each exchange operation, the second rotary axis member 16 is provided in two parts 216A,B. Parts 216A,B are repeatably engageable by means of a kinematic support provided by three pairs of adjacently positioned balls on part 216A, and three balls appropriately spaced on part 216B, as is well known in the art. Clamping and release may be provided by an electromagnetic system as described e.g. in our co-pending UK Application 9610936.8 and U.S. Pat. No. 5,041,806.

The bearings of the present application have been described with reference to air as the interstitial bearing medium. Other interstitial bearing mediums such as other fluids, or ball races may be provided. Additionally, planar annular surface 36 is illustrated as lying outside the sphere defined by spherical surface 34. In an alternative embodiment rear face 80 of the first bearing member 32 may be machined to provide the planar surface.

The embodiments of the present invention illustrated herein all include bearings in which one bearing body or bearing member of a bearing assembly bears directly via an interstitial bearing medium against the other body or member of an assembly. However the present invention applies equally to bearings and drive mechanisms which include a pair of relatively rotatable bearing bodies, both of which also rotate relative to a mechanically earthed member, such as are used in inertially balanced mechanisms (see e.g. WO90/07097).

What is claimed is:

1. Drive mechanism for rotating first and second relatively rotatable bearing members about an axis, the drive mechanism including an elongate drive shaft connected to the first bearing member and a motor connected to the second bearing member which rotates the shaft and first bearing member, and two torsionally stiff flexible connecting members, one of the connecting members connecting the drive shaft to the first bearing member and the other connecting member connecting the motor to the second bearing member, wherein each of the connecting members is stiffer to loads applied in a radial sense with respect to the axis than to flexing.

2. A mechanism according to claim 1, wherein at least one of the connecting members is in a form of a torsionally stiff flexible diaphragm.

3. A mechanism according to claim 1, wherein the first and second bearing members are part of a bearing assembly, and bear against each other via an interstitial bearing medium.

4. A mechanism according to claim 3, wherein the bearing medium is air.

5. A mechanism according to claim 3, wherein the first and second bearing members, respectively, have concave and convex spherical surface portions which circumscribe the axis and bear against each other via the interstitial bearing medium, the first and second bearing members further being provided with planar surface portions which circumscribe the axis and bear against each other via the interstitial bearing medium, wherein axial bearing forces on the bearing members at the spherical surface portions are counteracted by axial bearing forces on the bearing members at the planar surface portions.

6. An articulating probe head for orienting a probe relative to an arm of a coordinate positioning machine, the probe head including:

first, second and third relatively rotatable bodies which are serially mounted so that the second body is mounted to the first body and is capable of rotation relative thereto about a first axis and the third body is mounted to the second body and is capable of rotation relative thereto about a second axis the third body thereby being rotatable relative to the first body about both the first and second axes; and a pair of drive mechanisms provided to actuate the relative rotations, each drive mechanism having:
a pair of bearing members, each bearing member being connected to a body and the bearing members cooperating to define an axis of relative rotation; and a motor connected to a rotatable drive shaft for actuating the relative rotations wherein at least one of the motor and the drive shaft is connected to either the body or a bearing member via a flexible connecting member which is torsionally stiff to rotational motion about the axis.

7. A drive mechanism for rotating first and second bearing members relative to each other about an axis, the drive mechanism including a rotatable drive shaft which is connected to the first bearing member via a first torsionally stiff flexible connecting member, the drive shaft also being connected to a motor, which is in turn connected to the second bearing member via a second torsionally stiff flexible connecting member.

8. A mechanism according to claim 2, wherein the each torsionally stiff flexible diaphragm is substantially planar.

9. A rotary drive including:
first and second bearing members which are rotatable relative to each other about a rotary axis; and
a motor having first and second relatively rotatable motor parts which are connected to the first and second bearing members, respectively, wherein each of the motor parts is connected to a respective bearing member via a flexible connecting member which is rigid to torsional loads about the axis.

10. A rotary drive including:
first and second bearing members which are capable of mutual interaction via an interstitial bearing medium to define an axis of relative rotation of the drive;
a motor which has a stator connected to one of the bearing members and a rotor connected to the other of the bearing members, wherein at least one of the stator and rotor is connected to a respective one of the bearing members via a flexible connecting member which is torsionally stiff about an axis of relative rotation, and which is more resistant to loads applied radially than to flexing.

11. A rotary drive according to claim 10, wherein the interstitial bearing medium is a fluid.

12. A rotary drive according to claim 10, wherein the bearing members have cooperating convex and concave surfaces.

13. A rotary drive according to claim 10, wherein the each connecting member is substantially planar.

14. A rotary drive according to claim 13, wherein the each connecting member is in a form of a diaphragm.

15. A rotary drive for first and second relatively rotatable bodies including:
a pair of rotary bearing members, one of which is connected to the first body and one of which is connected to the second body, the bearing members being capable of mutual interaction via an interstitial bearing medium to define an axis of relative rotation of the first and second relatively rotatable bodies; and
a motor which produces relative rotation of the bodies about the axis and which has a pair of relatively rotatable motor parts, wherein each of the motor parts is connected to one of the bodies by a respective flexible connecting member which is resistant to torsional motion about the axis.

16. A rotary drive according to claim 15, wherein each respective flexible connecting member is more resistant to loads which are applied in a radial sense with respect to the axis, than to flexing.

17. A rotary drive according to claim 15, wherein a first of the flexible connecting members extends between one of the motor parts and one of the bodies, and a second of the flexible connecting members extends between the other of the motor parts and one of the bearing members.

18. A rotary drive according to claim 15, wherein one of the motor parts is connected to one of the bodies via a bearing member, and the other of the motor parts is connected directly to another of the bodies.

19. A rotary axis assembly including a pair of relatively rotatable bodies and a drive mechanism which defines an axis of relative rotation of the bodies, and provides actuation to cause the bodies to rotate relative to each other, the drive mechanism including:
a pair of bearing members, each of which is connected to one of the bodies, the bearing members being capable of mutual interaction via an interstitial bearing medium to define the axis;
a motor for actuating relative rotation of the bodies, which has two mutually interacting and relatively rotatable motor parts, the motor parts being operably connected to respective ones of the bodies via flexible connecting members which are stiff to torsion about the axis of relative rotation, wherein each of the flexible connecting members extends between either a motor part and the respective body, or a motor part and a bearing member connected to the respective body.

20. A rotary axis assembly according to claim 19, wherein one of the connecting members extends between one of the motor parts and a bearing member connected to the respective body, and the other of the connecting members extends between the other of the motor parts and the respective body.

21. A rotary axis assembly according to claim 19, wherein the interstitial bearing medium is a fluid.

22. A rotary axis assembly according to claim 21, wherein the fluid is air.

23. A rotary axis assembly according to claim 19, wherein the bearing members have cooperating convex and concave surfaces.

24. A rotary axis assembly according to claim 19, wherein at least one of the flexible connecting members is more resistant to loads which are applied in a radial sense with respect to the axis than to flexing.

* * * * *